United States Patent [19]

Johnson

[11] Patent Number: 5,107,688
[45] Date of Patent: Apr. 28, 1992

[54] CONDENSOR COIL SUPPORT CLIP

[75] Inventor: John I. Johnson, Ottawa, Ontario, Canada

[73] Assignee: ITW Plastiglide, Concord, Canada

[21] Appl. No.: 590,871

[22] Filed: Oct. 1, 1990

[30] Foreign Application Priority Data

Sep. 29, 1989 [CA] Canada ............................ 614991

[51] Int. Cl.⁵ .................... F25D 23/08; F16L 3/20
[52] U.S. Cl. ..................... 62/295; 248/74.2; 165/77
[58] Field of Search ............... 62/295, 298, 77; 165/77, 78, 76; 248/70, 74.2

[56] References Cited

U.S. PATENT DOCUMENTS

| | | | |
|---|---|---|---|
| 2,753,697 | 7/1956 | Baillif | 62/295 |
| 2,797,553 | 7/1957 | Bailiff | 62/295 |
| 2,880,597 | 4/1959 | Wellborn | 62/295 |
| 3,984,003 | 10/1976 | Gilreath | 248/70 |
| 3,990,262 | 11/1976 | Griffin | 62/295 |
| 4,440,374 | 4/1984 | Achille | 248/74.2 |
| 4,669,688 | 6/1987 | Itoh et al. | 248/74.2 |

Primary Examiner—Albert J. Makay
Assistant Examiner—William C. Doerrler
Attorney, Agent, or Firm—Schwartz & Weinrieb

[57] ABSTRACT

Disclosed is an integrally molded plastic clip for supporting coils in a condensor coil grid of a refrigerator or the like, comprising a mounting bracket for mounting said clip to a surface of the refrigerator and articulated sections having a hook for connection to a first coil segment of the coils and movable from a first retracted position wherein the first coil segment is closely adjacent the surface to a second extended position spaced outwardly therefrom. The articulated means comprise two sections, a first section pivotally connected at one end to the bracket and pivotally connected at its other end to an end of a second section, the other end of the second section includes the hook. Lock means extend from the mounting bracket below the hook for detachably locking to the clip a second coil segment of the coil grid below the first coil segment when the clip is in the first position. When the second coil segment is locked in the lock means, the first and second sections are generally parallel with the mounting means and the first coil segment and second coil segment are substantially vertically aligned. The lock means includes a releasable tongue and the first coil segment is connected with the hook such that when the lock tongue is released, the first and second coil segments move outwardly in their substantially vertical alignment with relative rotational movement between the hook and first coil segment.

20 Claims, 7 Drawing Sheets

CONDENSOR COIL SUPPORT CLIP

FIELD OF THE INVENTION

The invention relates generally to a two position support for supporting elements in a retracted position or an extended position with respect to a surface and more particularly to a support for supporting and securing condensor coils of a refrigerator in a shipping or retracted position but which support is capable of being moved to an extended position while still supporting the coils so that the coils are properly spaced from the rear of the refrigerator during use.

BACKGROUND OF THE INVENTION

Refrigerators (including some forms of upright freezers) have condensor coils exterior of and spaced from the back of the refrigerator for cooling refrigerant during the refrigeration process.

It is common for the coils to be supported by metal supports which are mounted upon the back of the refrigerator and which extend outwardly from the back of the refrigerator. The coils are supported from hooks spaced from the back of the refrigerator when it is in use. Often the coils are protected by means of a grid of vertical wires welded to the coils which grid also tends to dissipate heat from the coils. However, when the condensor coils are spaced from the back of the refrigerator, it is difficult to transport the refrigerator from manufacturer to retailer and from retailer to consumer without the possibility of damage being caused to the condensor coils. In practice, the existing supports are collapsible in such fashion that the condensor coils are disposed adjacent to the back of the refrigerator during shipping and therefore are much less susceptible to damage during movement of the refrigerator. Existing supports are often of stamped sheet metal, rust proofed and spring biased to an open or extended position. When the refrigerator is shipped, the supports or hooks are collapsed against the spring bias and the coils taped to the refrigerator so as to maintain them closely adjacent the back of the refrigerator. When the refrigerator is properly located in a user's premises, the tape is removed and the spring bias forces the coils to assume the spaced position for proper use of the refrigerator.

In practice, these existing supports are costly to manufacture and assemble requiring metal pieces, pivots and springs.

Furthermore, a separate and distinct bumper is often used to protect the coils from an adjacent wall and to prevent the wall from being scratched or marked by means of the coils and associated wire grid.

OBJECTS OF THE INVENTION

Accordingly, it is desirable to provide a support for condensor coils of a refrigerator or the like which is cost effective to manufacture and is lockable in a retracted shipping position with the condensor coils attached thereto and in an extended, or use, position whereby the coils are supported at a position spaced from the back of the refrigerator. It is also desirable to provide such supports with integral bumper means so as to reduce the necessity of a separate bumper means and to reduce the labour involved in attaching them to the coils or wire grid.

SUMMARY OF THE INVENTION

The invention pertains to a support or clip for supporting condensor coils of a refrigerator or the like.

More particularly, the invention pertains to a support or clip which is a two position support for supporting the coils in a retracted position closely adjacent to the back of the refrigerator so as to protect them from damage during shipping, storage and the like, and at a position extended from the back of the refrigerator whereby appropriate air circulation to the coils is provided.

The coil clip or support comprises means for mounting the clip to the back of a refrigerator, preferably a mounting system without screw fasteners or the like. There is an articulated portion comprised of two sections which assume a generally parallel orientation with the mounting bracket in a collapsed or retracted position but which may be extended to a position generally aligned with respect to each other and perpendicular to the mounting bracket.

One of the sections has hook means for holding a coil segment in both the retracted and extended positions. A lock element preferably associated with the mounting bracket locks the coils in a position closely adjacent to the back of the refrigerator by locking a next lower or adjacent coil segment to the clip. When the refrigerator is located or installed in its appropriate location for use, the lock element is released allowing the sections to assume their extended position and be locked by a different lock means in such a position. The coils move from the first to the second position in a retained vertical orientation generally planar with the back of the refrigerator.

The invention also comprehends a method of supporting the coils using the clip.

BRIEF DESCRIPTION OF THE DRAWINGS

Other aspects of the invention will become apparent from the description of a preferred embodiment herein with reference being made to the accompanying drawings, in which like reference characters designate like or corresponding parts throughout the several view, and wherein.

DESCRIPTION OF THE PREFERRED EMBODIMENT

Figure 1:
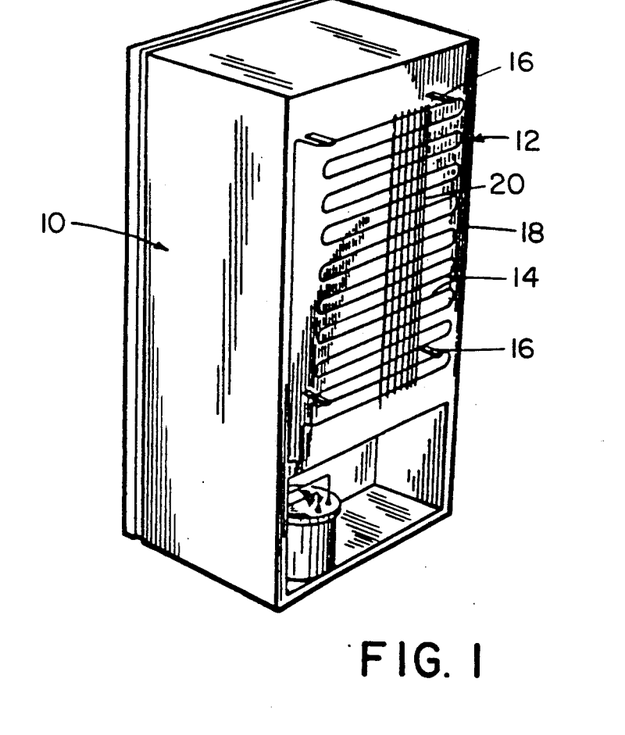
FIG. 1 is a rear perspective view of the back of a refrigerator and a grid or sheet of condensing coils.

FIG. 1 shows somewhat schematically a refrigerator 10 with a grid or sheet 12 of continuous condensor coil segments 14 supported by means of brackets or supports 16 upon refrigerator back 18. Usually a grid of wires 20, welded to the coils, provide unity and rigidity to the coil grid 12.

Figure 2:
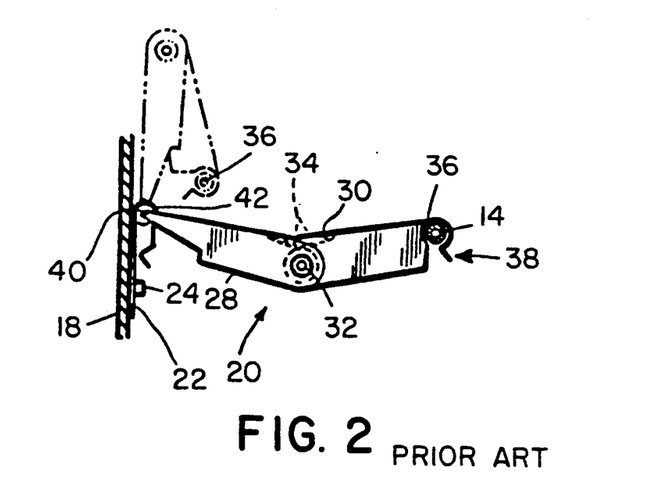
FIG. 2 is a side view of a prior art coil support, also showing in dotted lines the hook in a collapsed position.

FIG. 2 shows in a side view an existing clip or support 20 having a mounting bracket 22 secured to the back of refrigerator 10 by means of suitable fastener means 24. Support 20 has inner section 28 and outer section 30 pivoted together at 32 with a coil spring 34 disposed thereabout for spring biasing the two sections to the extended (full line) position shown in FIG. 2. Condensor coil segment 14 is supported by means of hook end 38 of section 30 and the inner end 40 of section 28 is configured for rotational connection with hook portion 42 of bracket 22 and pivotal connection relative thereto. The dot-dash lines in FIG. 2 illustrate clip or support 20 in the collapsed position, the support 20 and coil 36 being held in this collapsed position, usually by means tape (not shown), which is removed when the refrigerator is properly located for use.

Turning now to FIGS. 3, 4, 5 and 6, being respectively a perspective view, a side view, a rear view and a front view showing the retracted or closed position of support or clip 50 of the invention, clip 50 comprises integrally formed mounting bracket 52, first hinged support section 54, second hinged, coil support section 56, coil hook 58, bumper 60 and closed position lock section 62.

Mounting bracket 52 (FIGS. 4 and 5) has flat back 66 adapted to lie against back 18 of refrigerator 10, and has "one quarter turn" boss 68. Boss 68 has rectangular head 70 with chamfered peripheral edges 72, head 70 being supported in a spaced manner with respect to back 66 by means of rectangular neck portion 73. Head 70 has rectangular contact pads 74, 76 disposed upon its inner face 78 wherein such face is substantially parallel with and confronts flat back 66. The width of head 70 is such that it can be inserted within aperture 80 of back 18 of refrigerator 10 as shown in dotted lines in FIG. 4. When support 50 is then rotated 90° (quarter turn), pads 74, 76 securely contact the inside of the refrigerator back 18 so as to hold support 50 securely in place as shown in FIG. 9.

Figure 3:
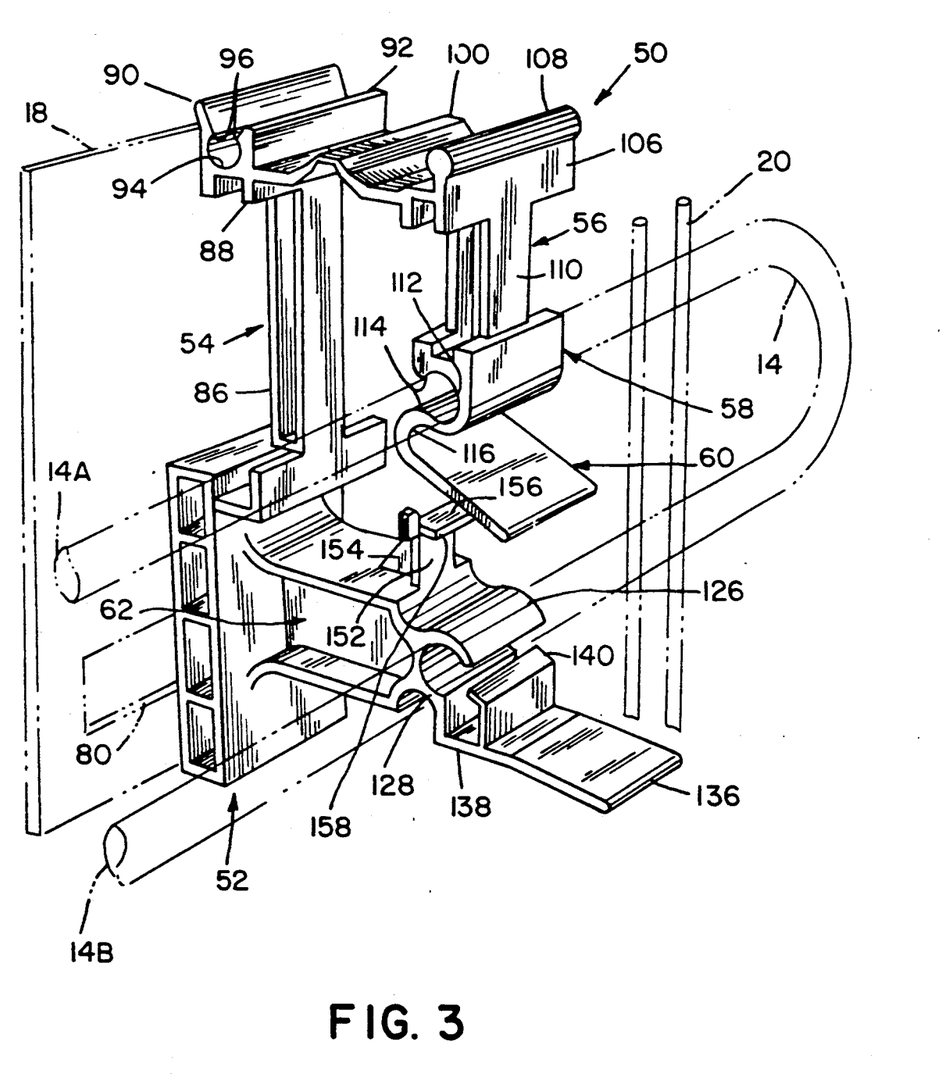
FIG. 3 is a perspective view of a support according to the invention when locked in its retracted or collapsed position.
Figure 4:
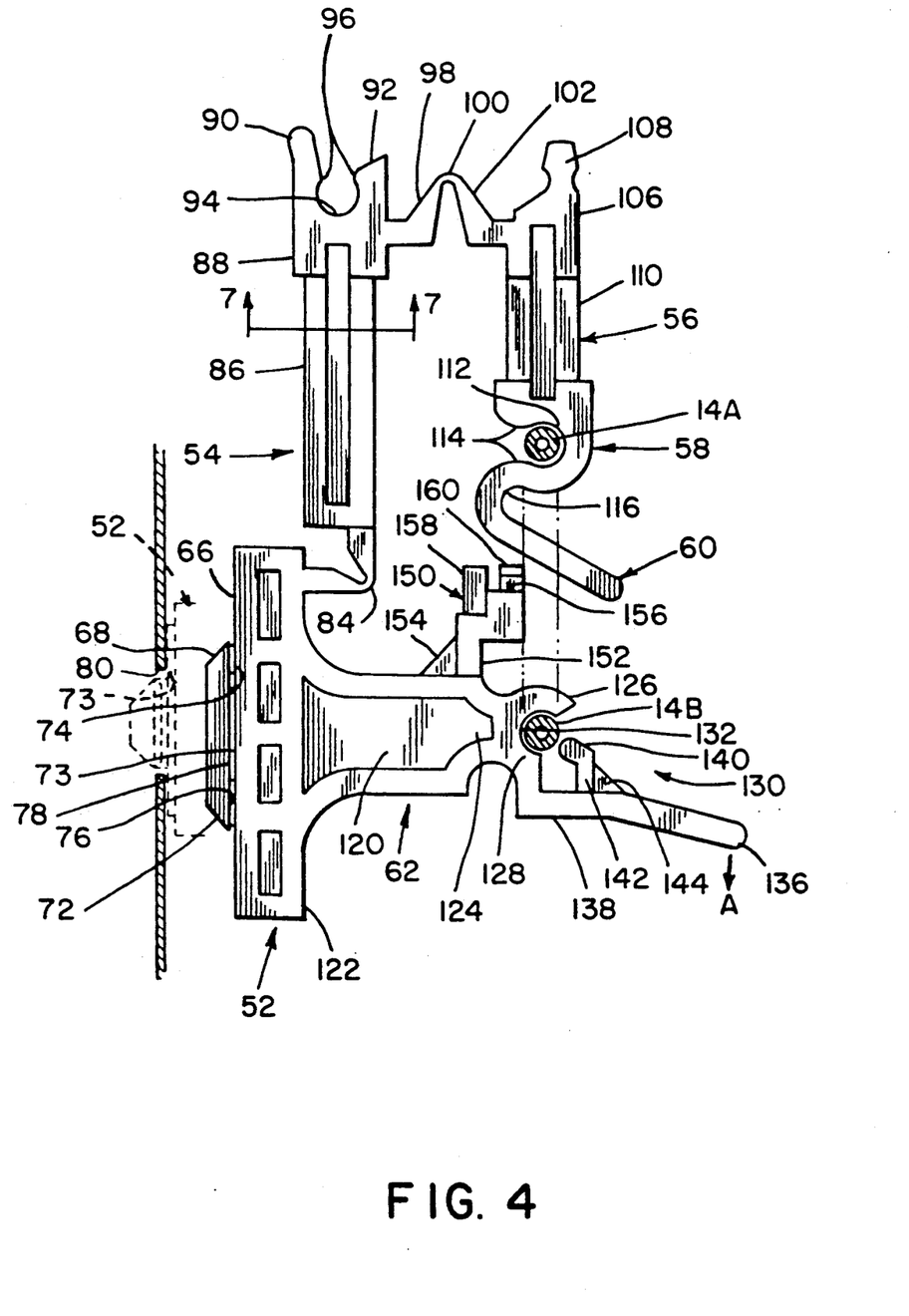
FIG. 4 is a side view (partly in section) of the support according to the invention adjacent to a refrigerator back, the support being locked in its retracted position as also shown in FIG. 3.
Figure 5:
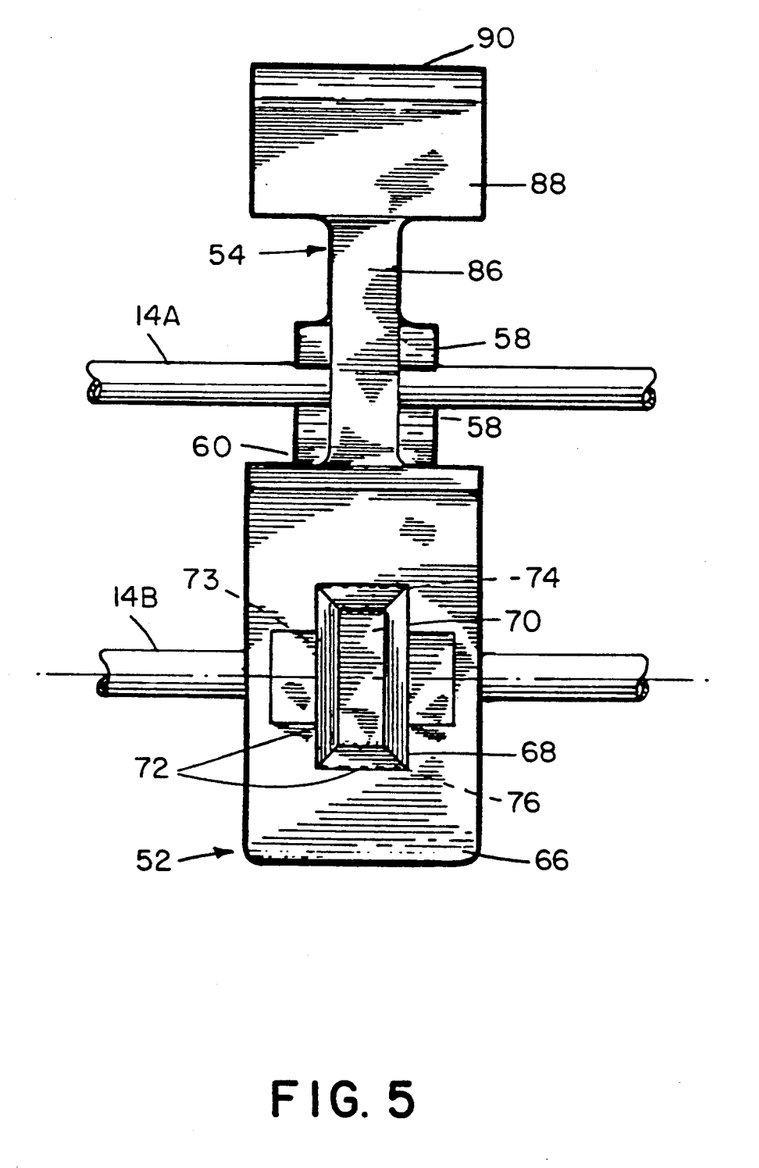
FIG. 5 is a rear view of the novel support as seen in FIG. 4.
Figure 6:
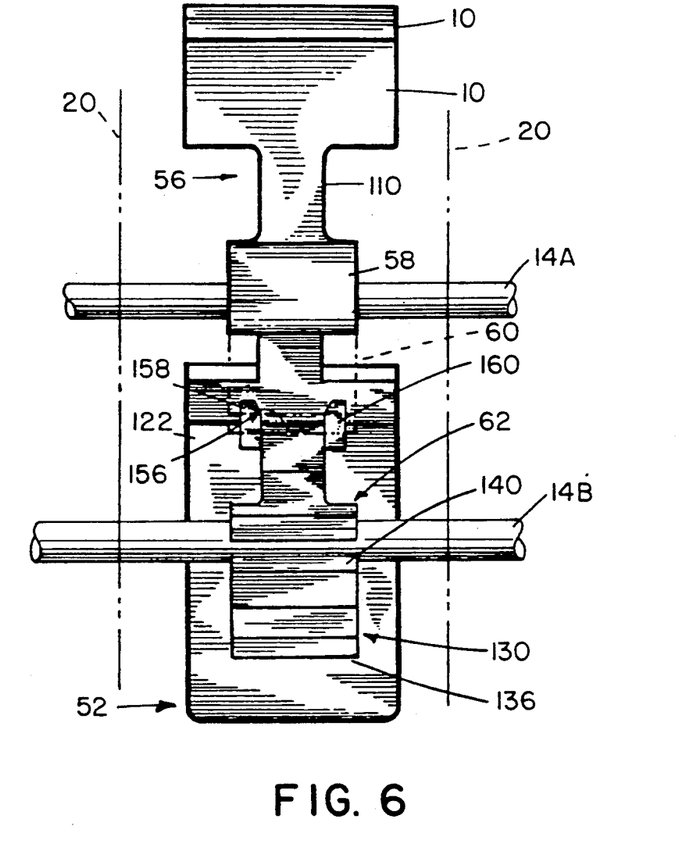
FIG. 6 is a front view of the novel support as seen FIG. 4.

First hinged support section 54 is hingedly secured at 84 to bracket 52 and as shown in FIGS. 3 and 4 is adapted for extending upwardly in a generally planar or parallel manner with respect to mounting bracket 52. Section 54 comprises beam 86 of generally "I" shaped configuration in cross section (FIG. 7) and at the upper end thereof there is provided a female lock element 88. Lock element 88 has guide elements 90, 92 which are configured so as to define cylindrical recess 94 having reduced neck portion 96. Extending laterally from lock element 88 is hinge support 98, supporting hinge 100 which pivotally supports second, coil support section 56 relative to first support section 54 through means of lateral hinge support 102.

Figure 7:
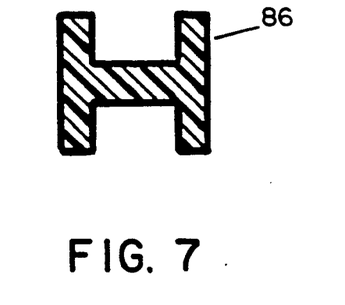
FIG. 7 is a sectional view taken along lines 7—7 of FIG. 4.
Figure 8:
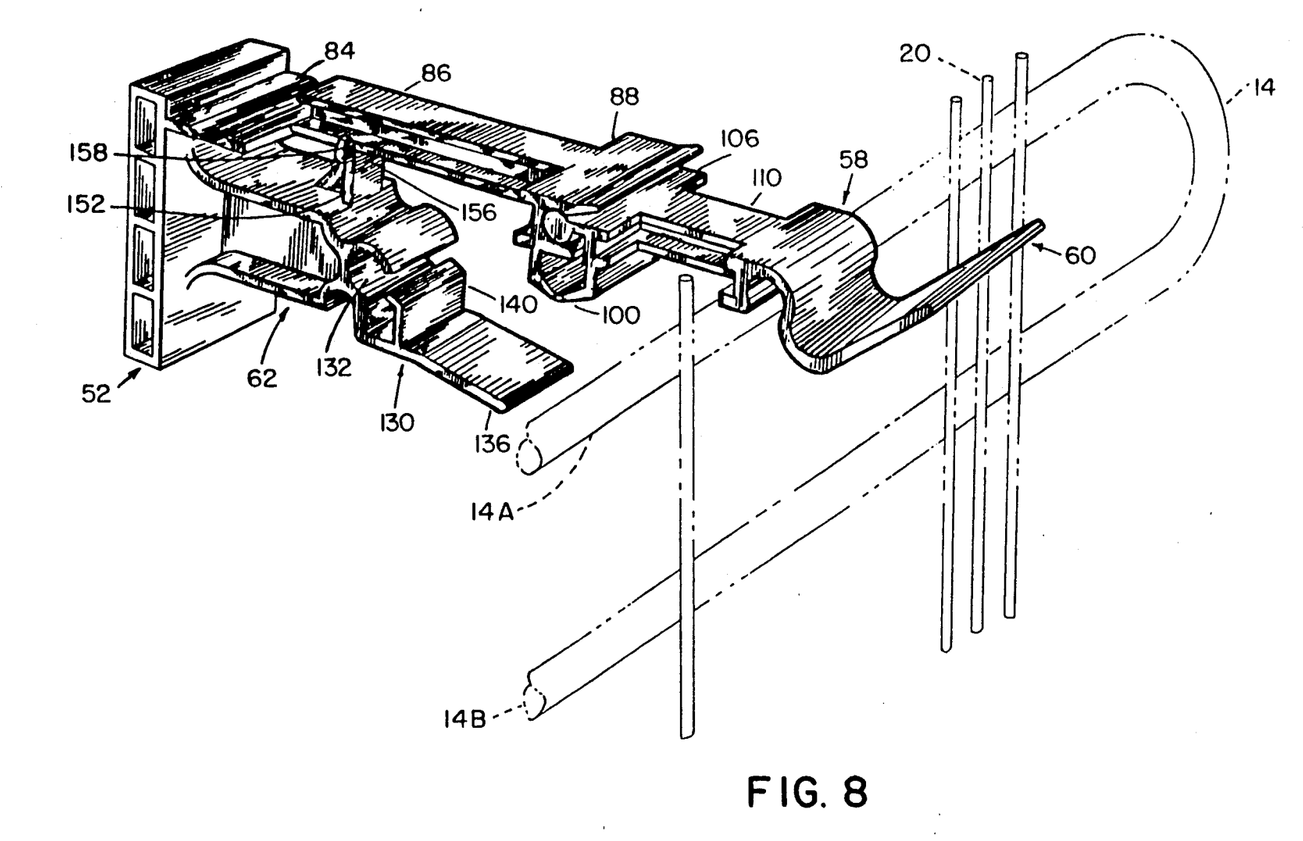
FIG. 8 is a perspective view of the support of the invention locked in its extended position in order to space the condensor coils from the back of a refrigerator.
Figure 9:
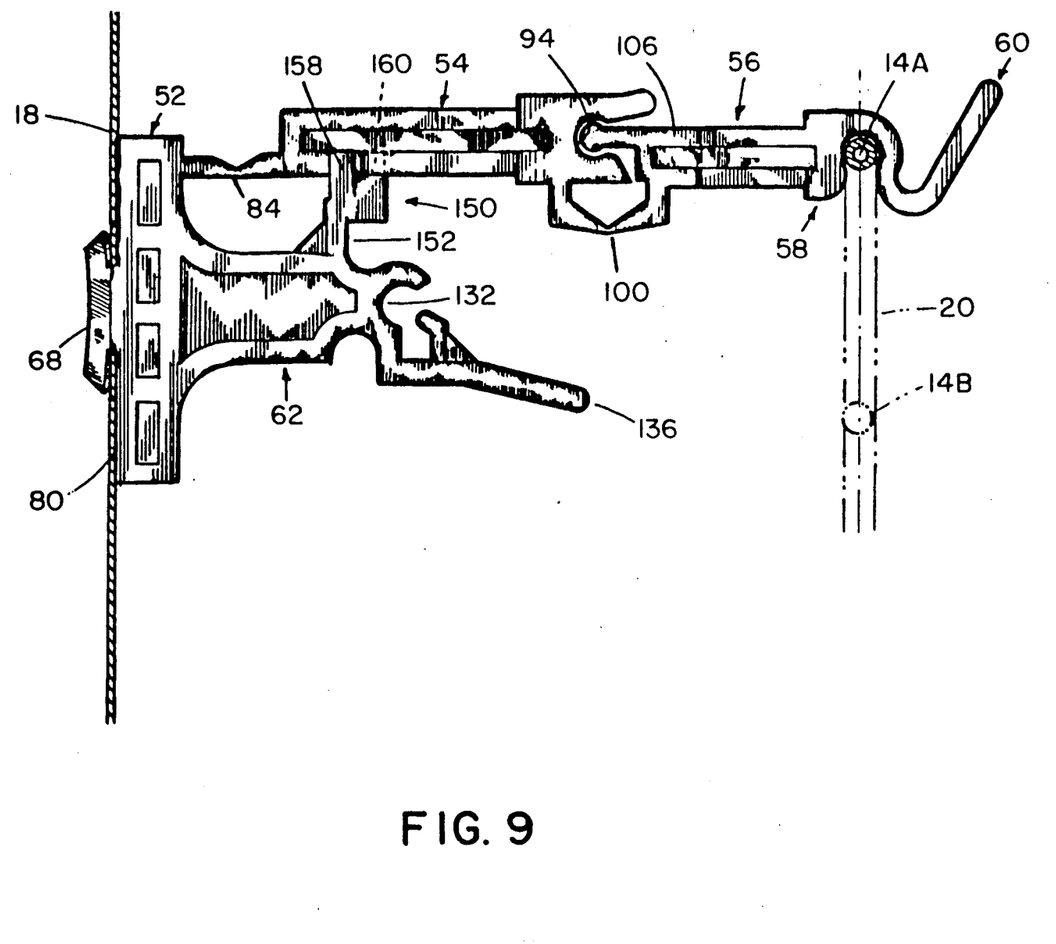
FIG. 9 is a side view partly in section of the inventive support in its extended position and in operative association with a refrigerator back.

Second support section 56 is hingedly connected to first section 54 in such a manner that sections 54 and 56 pivot 90° from the collapsed position shown in FIGS. 3 and 4, wherein section 54 is generally planar with mounting section 52 and section 56 is juxtaposed in a generally parallel position with respect to section 54, to an extended position shown in FIGS. 8 and 9 wherein sections 54 and 56 are generally in line or aligned with each other and disposed perpendicular to the plane of mounting bracket 52. Male locking element 106 has an end 108 which is complementary to female lock element recess 94 and is adapted to securely cooperate therewith. Lock elements 88 and 106 are appropriately designed and configured for a tight snap fit connection. Section 56 also includes "I" shaped beam 110 between male lock element 106 and coil hook 58, wherein beam 110 is similar in cross-section to beam 86 (FIG. 7). Hook 58 defines cylindrical recess 112 into which a coil segment 14a of the condensor coils may be located in a snap fit action through means of hook neck portion 114.

Bumper 60 is in the form of a flexible extension of coil hook 58 and flexes about curved portion 116.

Closed position lock section 62 comprises beam 120, "I" shaped in cross-section, wherein the beam extends from front face 122 of mounting bracket 52. Beam 120 narrows at its outer end 124 whereby flanges 126, 128 merge in such a fashion as to define a coil lock support 130 having concave surface 132 adapted to support a condensor coil segment 14b which is the next adjacent lower coil segment with respect to segment 14a. Release lock lever or tab 136 is flexibly hinged at 138 to beam flange 128 and has locking tongue 140 adapted to contact coil segment 14b so as to lock the same into position against surface 132. Locking tongue 140 is located upon lever 136 at point 142 outwardly of hinge 138 and has gusset 144 enhancing the rigidity of its connection with lever 136. Movement of lever or tab 136 downwardly (in the direction of arrow A, FIG. 4) against its inherent normally biased position shown in FIG. 4 causes tongue 140 to release coil segment 14b from lock support surface 132.

Supported upon beam 120 is hinge support 150 having upstanding post 152 with support gusset 154. At the upper end of post 152 is horizontal surface 156 and laterally spaced wing elements 158, 160. Wing elements 158, 160 extend upwardly from surface 156 and are spaced laterally apart a distance substantially equal to the width of beam 86. The separation of wing elements 158, 160 along surface 156 (as seen in FIG. 4) is for molding and production purposes which will be apparent to those skilled in the plastic molding art. Other than the offset or separation of wing elements 158, 160, hinge support 150 is identical and symmetrical from side to side.

Coil clip or support 50 is specifically designed for use with a refrigerator having a plurality of mounting apertures 80, the longitudinal orientation of apertures 80 being disposed 90° with respect to the longitudinal orientation of mounting head 68 when support 50 is disposed at its mounted position (FIG. 9). There are several apertures 80 spaced over the back 18 of a refrigerator 10 although only one is shown in FIGS. 4 and 9. The periphery of the aperture 80 as previously noted is such that a secure "¼ turn" connection is made by means of head 68 with respect to the back 18 of refrigerator 10. The grid of coils 12 is then located such that certain predetermined coil segments 14a are connected with coil hooks 58 and the next lower coil rung 14b of the coil segment is locked into place within lock 130 as shown in FIGS. 3 and 4.

With the coils supported in the position shown in FIGS. 3 and 4, the coils are firmly held and locked closely adjacent refrigerator back 18 and are ready for storage or shipping. The exposure of the coil grid and coil segments to damage is significantly reduced.

Once the refrigerator is located or installed in its desired position, release tab 136 is pressed downwardly in the direction of arrow A, FIG. 4, which releases the lower coil segment 14b of the two coil segments 14 as shown in FIG. 4. With each of the coil clips 50 associated with coil segments 14b upon the back 18 of a refrigerator similarly released, the complete grid of coils 12 rigidified by means of wire grid 20 may be pulled outwardly away from the back 18.

The coil hook 58 rotates relative to the coil segment 14a therein and the coil grid 12 is extended until male and female lock elements 88 and 106 come into contact with each other. The lock elements 88 and 106 of each support 50 are snap fitted together whereupon the condensor coil sheet is locked in position whereby the coils are spaced from the refrigerator back 18 at an appropriate distance so as to permit air circulation for proper operation of the condensor coils.

Beam 86 rests upon surface 156 between wings 158, 160 of hinge support 150 so as to laterally and vertically support the beam 86 in its extended position.

As will be apparent from FIGS. 8 and 9, the coil segment 14b which was locked between surface 132 and tongue 140 moves slightly outwardly and downwardly. Although only a few wires of grid 20 are shown, it will be appreciated that the wires are spaced across the coil segments generally from top to bottom of the coil condensor with appropriate gaps being left where the parts of clips or supports 50 are to be cooperatively connected with the coil segments.

Bumper 60 is also in position so as to prevent direct contact between the condensor coils and grid 20 with any adjacent surface.

Accordingly, there is provided a unique condensor coil support clip which is capable of cost effective integral molding of plastic material which provides locking means in both the retracted and extended positions as well as providing a bumper means to protect any wall surface with which the back of the refrigerator may be closely associated.

It will be appreciated that various plastic materials may be used but polypropylene is particularly preferred in view of its cost effective integral molding capabilities in providing a strong, yet lightweight support clip at reasonable costs.

Furthermore, it will be appreciated that any screw fastener mounting means may be used in lieu of the "¼ turn" mounting means shown and preferred with the invention.

Although there has been shown a lock mechanism for retaining the clip in its retracted position which cooperates with a second coil segment, the first being held in the hook means, it will be appreciated that other lock mechanisms are possible such as a detachable lock mechanism between the two beams 86 and 110 or between the hinge support 150 and the end of hook 58 adjacent part 116 of bumper 60.

Accordingly, although a preferred embodiment has been shown and described in detail, various modifications and changes in addition to those noted, may be made therein without departing from the spirit and scope of the invention as defined in the appended claims.

The embodiments of the invention in which an exclusive property or privilege is claimed are defined as follows:

1. A plastic clip for supporting refrigeration coils of a coil grid of a refrigeration apparatus, comprising:
   means for mounting said clip upon a surface of said refrigeration apparatus;
   articulated means including hook means for connection with a first coil segment so as to support said first coil segment in two positions of said clip and during movement of said first coil segment between said two positions of said clip, said positions being a first retracted position wherein said articulated means is folded and said first coil segment is disposed close to said surface of said refrigeration apparatus, and a second extended position wherein said articulated means is extended from said folded position and said first coil segment is spaced away from said surface of said refrigeration apparatus; and
   first and second means for locking said clip in each one of said two positions.

2. The clip according to claim 1 wherein:
   said first locking means is adapted to retain said articulated means in a retracted position when said clip is in said first position, and said second locking means associated with said articulated means is adapted to retain said articulated means in an extended position when said clip is in said second position.

3. The clip according to claim 1 wherein:
   said first locking means includes means adapted to cooperate between said mounting means and a second coil segment of said grid so as to lock said clip in said first position.

4. The clip according to claim 3 wherein said cooperating means includes means extending outwardly from said mounting means and having locking elements at its free end adapted to detachably lock with said second coil segment and retain said clip in said first position.

5. The clip according to claim 1 wherein said articulated means comprises a first section and a second section, said first section being pivotally hinged to said mounting means and adapted to pivot from a position generally planar with said mounting means when said clip is in said first clip position to a position perpendicular to said mounting means when said clip is in said second position, said second section being pivotably hinged to said first section and adapted to move from a position parallel with and laterally adjacent to said first section in said clip first position to a position aligned with said first section in said clip second position.

6. The clip according to claim 5 wherein said first and second sections have complementary locking means for locking said sections rigidly together when in said aligned position.

7. The clip according to claim 5 including means outward of said hinge connection between said mounting means and said first section for supporting said first section in said clip second position.

8. The clip according to claim 1 wherein said second section has said hook means at its distal end and said clip further includes bumper means extending outwardly from said hook means.

9. An integrally molded plastic clip for supporting coils in a condensor coil grid of a refrigerator or the like, comprising:
   means for mounting said clip to a surface of the refrigerator;
   articulated means having a hook means for connection to a first coil segment of said coils and movable from a first retracted position wherein the first coil segment is closely adjacent the surface to a second extended position spaced outwardly therefrom, said articulated means comprising two sections, a first section pivotally connected at one end to said mounting means and pivotally connected at its other end to an end of a second section, the other end of said second section including said hook means;

means extending from said mounting means below said hook means supporting lock means adapted for detachably locking to said clip a second coil segment of said coil below said first coil segment when said clip is in said first position;

whereby, when said second coil segment is locked in said lock means, said first and second sections are generally parallel with said mounting means and said first coil segment and second coil segment are substantially vertically aligned.

10. The clip according to claim 9 wherein said lock means includes a releasable tongue and said first coil segment is connected with said hook means such that when said tongue is released, said first and second coil segments move outwardly in substantially vertical alignment with relative rotational movement occurring between said hook means and first coil segment.

11. The clip according to claim 10 wherein said first and second sections pivotably hinge relative to said mounting means and each other whereby said sections in said clip second position are aligned in position with each other and generally perpendicular to said mounting means, and further including means for locking the first and second sections in said aligned position.

12. The clip according to claim 11 wherein said mounting means includes means for supporting said first section in said aligned position.

13. The clip according to claim 12 wherein said first section supporting means is associated with said lock supporting means which extends from said mounting means.

14. The clip according to claim 13 wherein said first section supporting means includes surface means to support said first section perpendicular to said mounting means in said aligned position and further including laterally spaced wing means to restrict lateral movement of said first section in said aligned position.

15. A method of supporting condensor coils of a refrigerator or the like having a grid of coil segments comprising the steps of:

providing a clip having means for mounting the clip to a back of a refrigerator, said clip having articulated means including a hook for supporting a coil segment closely adjacent said back of said refrigerator in a retracted, first position and movable to a position supporting said coil segment spaced from the back of said refrigerator in an extended second position, said clip having means for locking said articulated means in said second position and means cooperating with a second coil segment for detachably locking said clip in the first position; mounting said clip to said refrigerator back;

connecting a first coil segment to said hook means; and connecting a second coil segment to said cooperating detachable lock means so that said coil segments are substantially in a plane parallel to said back of said refrigerator.

16. The method of claim 15 further comprising the steps of selectively detaching said lock means from said second coil segment and moving said articulated means to said extended second position; and locking said articulated means in said second position whereby relative rotation between said hook means and said first coil segment permits said coil segments to substantially remain in a plane substantially parallel to said back of said refrigerator when said clip moves from said first position to said second position.

17. The clip of claim 5, wherein:

said second locking means comprises male and female locking elements respectively provided upon said second and first articulated sections for engaging each other when said first and second articulated sections are disposed at their aligned second clip position.

18. The clip as set forth in claim 17, wherein:

said second locking means further comprises upstanding support means disposed outwardly of said hinge connected defined between said mounting means and said first section for engaging said first section when said first section is disposed at said second position perpendicular to said mounting means.

19. The clip as set forth in claim 3, wherein:

said first locking means comprises socket means defined within said cooperating means for housing said second coil segment, and a locking tongue cooperating with said socket means and engaging said second coil segment in a releasable manner whereupon movement of said locking tongue to a released position, said second coil segment is released from said socket means.

20. The clip as set forth in claim 1, wherein:

said clip is fabricated from polypropylene.

* * * * *